Sept. 8, 1931.  J. HARTNESS  1,822,028
SCREW THREAD GAUGE AND METHOD OF GAUGING
Filed March 20, 1929

Inventor:
James Hartness.
by Wright Brown Quinby & May
Attys.

Patented Sept. 8, 1931

1,822,028

UNITED STATES PATENT OFFICE

JAMES HARTNESS, OF SPRINGFIELD, VERMONT

SCREW THREAD GAUGE AND METHOD OF GAUGING

Application filed March 20, 1929. Serial No. 348,617.

This invention relates to a gauge for indicating errors of flank thickness and lead in screw threads and to the method of gauging screw threads. In gauging threads it is desirable that a gauge be easy to manipulate, subject to a minimum of wear when in normal use, and that it indicate not only the presence and amount of error in pitch diameter and lead, but also whether such errors alone or combined are sufficient to warrant the rejection of a threaded member under test. It is also desirable that a gauge indicate clearly whether a thread under test is well within the limits of tolerance or not, and, if not, by what margin it escapes rejection, so that when, for example, a thread cutting machine wears so as to turn out threads having errors which increase with the wear on the cutting edges of the machine, this tendency may be noted and corrected before the error becomes of sufficient magnitude to overstep one of the limits of tolerance and require the rejections of some of the work. It is an object of the invention to produce a gauge having these and other desirable properties.

A gauge of the type embodying the present invention may comprise essentially a pair of coaxial threaded plug or ring members held against relative rotation, but relatively movable along their common axis. The threads of these members have identical characteristics so that they have a relative position in which the two threads lie in a common helix. The threads of the gauge members are preferably formed with a pitch diameter just small enough in the case of the plug type to permit the gauge members to enter easily into threaded engagement with an interior thread having the minimum tolerated pitch diameter and no lead error and just large enough in the case of the ring type to receive easily a thread of the kind to be gauged having the maximum tolerable pitch diameter and no lead error. This means that any interior thread of the kind and size corresponding to the gauge will receive the gauge members provided that it is within the limits of tolerance, and that there will be more or less slack or back-lash between such a thread and the threads of the gauge members according to the deviation of such thread from the minimum tolerance limit and/or the presence of lead error. According to the present invention this slack may be taken up by moving the two gauging members axially toward and away from each other until in each case the threads of the gauging members press against opposite flanks of the thread under test. Suitable means is provided for magnifying and indicating the extent of such relative motion. Various further advantageous features of construction will be apparent to one skilled in the art from the disclosure of the invention which follows, and on the drawings, of which—

Figure 1:
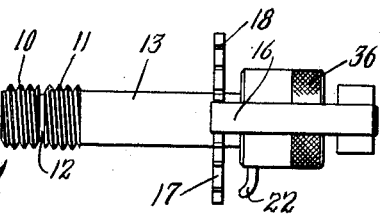
Figure 1 is a side elevation of a gauge of the plug type embodying the invention.
Figure 2:
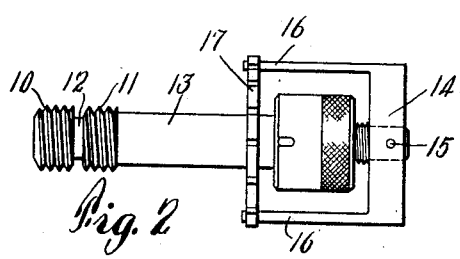
Figure 2 is a side elevation from a different angle of the same gauge.
Figure 6:
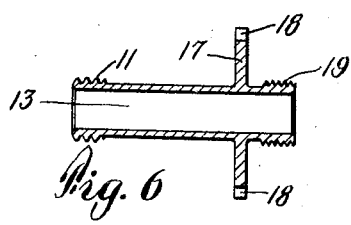
Figure 6 is a section of the sleeve which carries the other gauging member.
Figure 7:
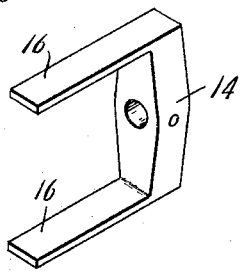
Figure 7 is a perspective view of the yoke which is secured to the spindle.

Referring to the drawings in detail, the gauge illustrated in Figure 1 consists essentially of a pair of threaded members 10 and 11 which are coaxially supported respectively by a spindle 12 and a sleeve 13, the spindle 12 being fitted within the sleeve and projecting from both ends thereof. The threaded member 10 is formed on or secured to one of the projecting ends of the spindle, the yoke 14 being secured on the other end of the spindle as by a pin 15. As shown in Figures 2 and 6, the yoke 14 may comprise a cross head from which a pair of arms 16 extend back toward the opposite end of the spindle. Formed upon or secured to the sleeve 13 is a radial flange 17 which is in the form of a disk. The peripheral portion of this flange may be notched as at 18 to receive the ends of the arms 16 in closely fitted engagement so that relative rotation between the sleeve 13 and the spindle 12 is thereby prevented, while relative axial motion is permitted.

The threads of the members 10 and 11 are preferably formed with no lead error and with a pitch diameter sufficiently small to fit loosely within a thread gauge having the minimum tolerable pitch diameter. Thus when the threads 10 and 11 are in threaded engagement with any corresponding thread which is within the limits of tolerance, there will be a certain amount of slack or back-lash between the gauging members and the thread to be tested. The amount of such back-lash is an indication of the flank thickness of the thread under test. By imparting relative axial motion to the members 10 and 11 toward and away from each other while in threaded engagement with a screw thread to be tested, the extent of such motion from a position in which the threads 10 and 11 lie in a common helix indicates not only the flank thickness of the screw thread under test, but also the presence or absence of lead error in such thread. Since lead error is equivalent to an axial stretching out or crowding together of the successive turns of a thread, it is apparent that where lead error is present in the thread under test, the motion of the members 10 and 11 toward and from each other will be unequal. Thus when the gauge is inserted in a threaded member to be tested, unequal motions of the gauge members from their normal position in which the threads lie in a common helix, will indicate the presence of lead error in the screw under test.

Figure 3:
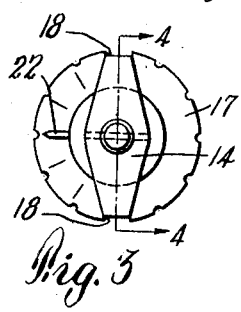
Figure 3 is an end elevation of the same.
Figure 4:
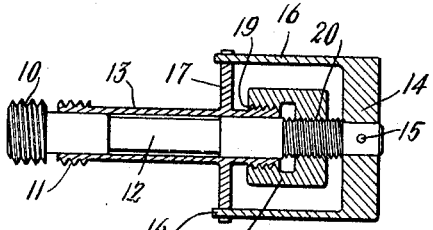
Figure 4 is a section on the line 4—4 of Figure 3.
Figure 5:
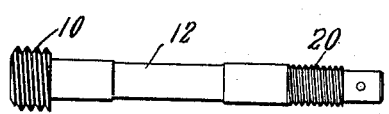
Figure 5 is an elevation of the spindle which carries one of the gauging members.

In order to control the relative axial movement of the members 10 and 11, I may form suitable threads 19 and 20 on adjacent portions of the sleeve 13 and spindle 12, respectively, the threads 19 and 20 having different leads. A suitable nut 21 may be provided, this nut having internal threaded portions of different leads adapted to engage respectively the threaded portions 19 and 20. As indicated in Figure 4, rotation of the nut 21 on the threads 19 and 20 will result in a slow relative axial movement between the spindle 12 and sleeve 13 due to the difference in lead of the threads 19 and 20. If the difference in lead between the threads 19 and 20 be small, a relatively large angle of rotation of the nut 21 will be required to produce a relatively small axial movement between the members 10 and 11. Hence the relative movement of the members 10 and 11 may be greatly magnified for facility in indicating their motions. On the periphery of the nut 21 may be mounted a suitable index 22 having an end extending over in suitable proximity to the adjacent face of the flange 17. This face of the flange, as indicated in Figure 3, may be provided with suitable markings to cooperate with the index 22. Such markings may indicate the limits of tolerance zones for the particular class of screw thread to be gauged, or scale markings may be made on this face in terms of any desired unit of length or in terms of percentages of flank thickness of the screw thread. The edge of the flange 17 may be milled or notched in order to provide a better finger-hold. For the same purpose a portion of the periphery of the nut 21 may be knurled.

This gauge is simple and easy to construct and is very durable, since the threads of the members 10 and 11 are adapted to enter threaded members to be tested with a loose fit so that there is no interfacial sliding engagement under pressure between the flanks of the threads 10 and 11 and the flanks of the threads to be tested. When in the course of gauging movement, the flanks of the threads 10 and 11 are pressed tightly against the flank of the screw to be tested such pressure is frontally applied without any sliding engagement, so that wear on the flanks of the gauging members 10 and 11 is substantially eliminated. The threads 19 and 20 are protected by the nut 21 and may be well lubricated. As the gauging movement of the nut on these threads is relatively slight, the wear on these protected and lubricated threads is also very slight.

Figure 8:
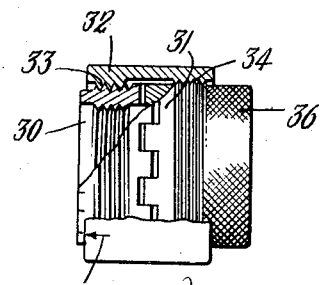
Figure 8 shows in elevation a gauge of the ring type for external threads.

A gauge of the ring type which operates in the same way as the plug gauge of Figure 1 is illustrated in Figure 8. This consists of a pair of gauging members 30, 31 having interior gauging threads capable of lying in a common helix. The members 30, 31 may be prevented from relative rotation as by interengaging crenelated end portions as illustrated or by any equivalent means. A ring 32 may be in threaded engagement with the members 30 and 31 as by threads 33 and 34 respectively, which threads are preferably of different lead. In order to indicate the "open" position of the gauge, in which the gauging threads of the members 30, 31 lie in a common helix, a suitable index 35 may be formed or marked to cooperate with a mark on the adjacent end portion of the gauge member 30. This member may also have suitable scale marks or zones of tolerance indicated thereon. To facilitate the application of the gauge to a thread to be tested, and removal therefrom, the outer end portion of the member 31 may project from the ring 32 and may be knurled as at 36. A portion of the outer surface of the ring 32 may also be knurled if desired.

The operation of this gauge is identical with the operation of the gauge shown in Figure 1. The index 35 is set at the "open" mark, then the gauge is screwed on to the thread to be tested. The collar 32 may then be rotated in both directions from the "open" position until the gauging threads of the members 30 and 31 bind on the flanks of the thread under test. The amounts of these rotations are indicated by the position of the index 35, and the tested thread may be accepted or rejected according as the index falls inside or outside of either of the zones of tolerance.

An embodiment of this invention having thus been described, it should be evident to those skilled in the art that various changes and modifications might be made therein without departing from its spirit or scope as defined by the appended claims.

I claim:

1. A method of gauging a screw thread which comprises engaging said thread with a pair of loosely fitted gauging threads arranged to lie in a common helix, holding said gauging threads against relative rotation, moving said threads axially toward and from each other while so held until they are in binding engagement with the flanks of the thread under test, and measuring the extents of such relative motions in both directions from said position in a common helix.

2. A screw thread gauge comprising a pair of coaxial threaded gauging members capable of adjustment to a position wherein their threads lie in a common helix, said threads being capable of loosely fitted engagement with any coresponding thread of a member to be gauged within the limits of tolerance, means for preventing relative rotation between said members, means for moving said members axially toward and from each other and in either direction from the position wherein threads lie in a common helix, and means for indicating the amounts of such relative movements of said members in both directions from said adjusted position.

3. A screw thread gauge comprising a pair of externally threaded coaxial gauging members having threads adapted to lie in a common helix and to fit loosely within a thread of a member to be tested having the minimum tolerable pitch diameter, means for preventing relative rotation between said members, means for moving said members axially toward and from each other from said position in which their threads lie in a common helix, and means for indicating the extents of said relative movement.

4. A screw thread gauge comprising a pair of coaxial threaded gauging members adapted to lie in a relative position wherein their threads lie in a common helix, a sleeve carrying one said member and coaxial therewith, a spindle carrying the other said member and fitted within said sleeve, means for preventing relative rotation between said members, and means for imparting relative axial movement to said members, said movement-imparting means including threads of different leads on said sleeve and spindle, and a nut having internal threaded portions engaging respectively said threads of different leads.

5. A screw thread gauge comprising a pair of co-axial threaded gauging members adapted to lie in a relative position wherein their threads are in a common helix, a sleeve carrying one of said members and coaxial therewith, a spindle carrying the other of said members and fitted within said sleeve and projecting therefrom, a yoke secured to the projecting portion and having arms extending over a portion of said sleeve, a radial flange on said sleeve having notches in the periphery thereof to receive said arms in fitted engagement whereby relative rotation between said members is prevented, threads of different leads formed respectively on said projecting portion of the spindle and on a portion of the sleeve adjacent thereto, a nut having internal threads in fitted engagement with said threads of different leads, tolerance zone limit marks on a face of said flange, and an index on said nut adapted to cooperate with said limit marks.

In testimony whereof I have affixed my signature.

JAMES HARTNESS.